May 21, 1963 W. H. HOLZBOOG ETAL 3,090,560
GAS REGULATOR APPARATUS
Filed Feb. 29, 1960 3 Sheets-Sheet 1

Walter H. Holzboog,
Harold C. Reinhart,
Stanwood E. Marr, Jr.
Inventors.
Koenig and Pope
Attorneys.

May 21, 1963 W. H. HOLZBOOG ETAL 3,090,560
GAS REGULATOR APPARATUS
Filed Feb. 29, 1960 3 Sheets-Sheet 2
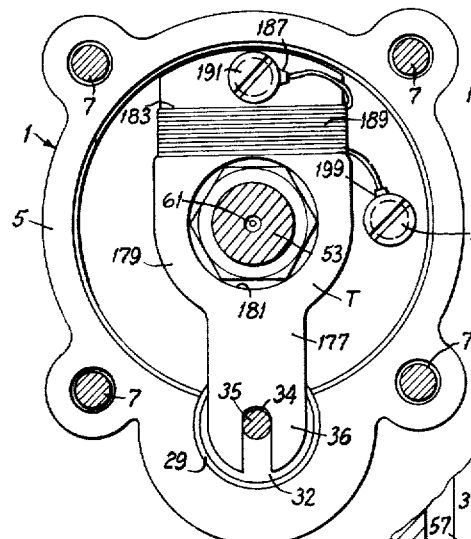
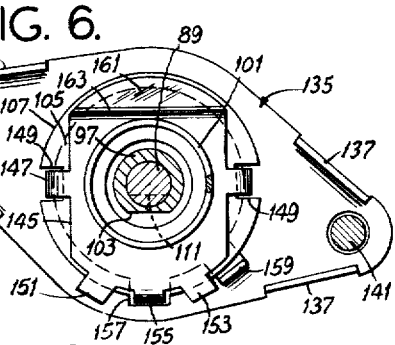
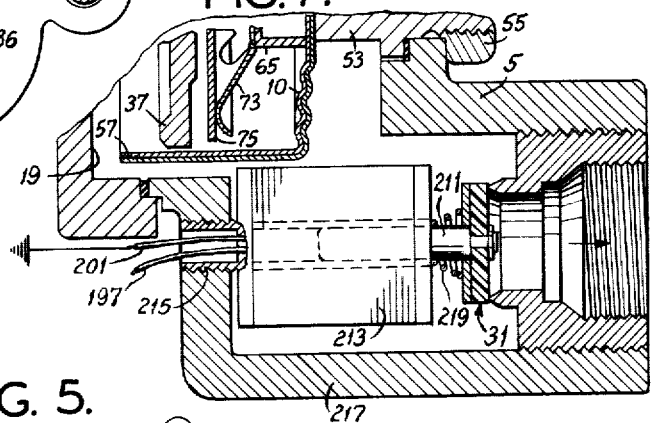
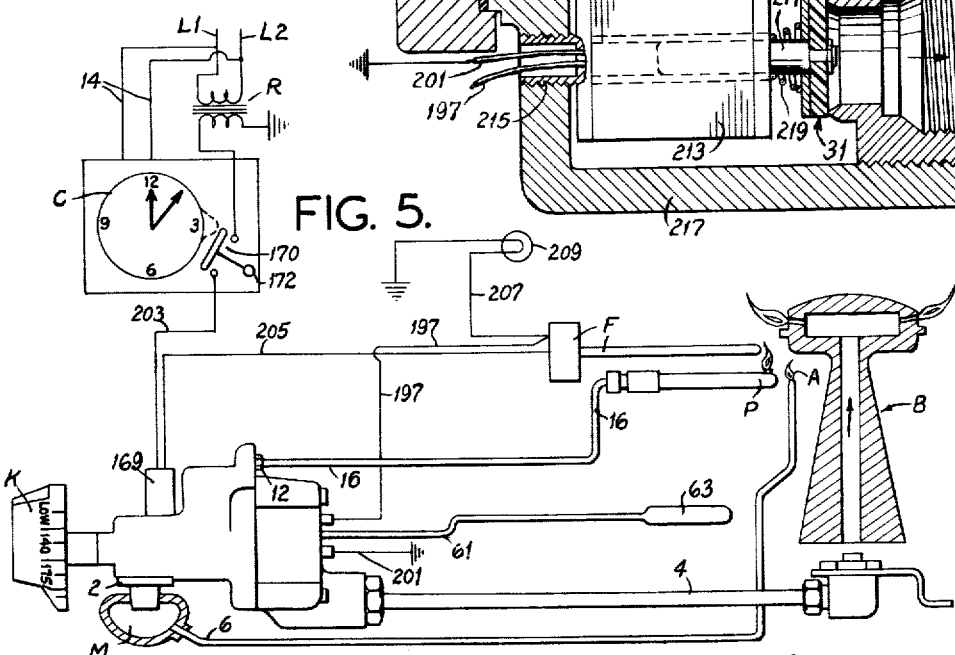

May 21, 1963 W. H. HOLZBOOG ETAL 3,090,560
GAS REGULATOR APPARATUS
Filed Feb. 29, 1960 3 Sheets-Sheet 3

United States Patent Office 3,090,560
Patented May 21, 1963

3,090,560
GAS REGULATOR APPARATUS
Walter H. Holzboog, Clayton, and Harold C. Reinhart, Ferguson, Mo., and Stanwood E. Marr, Jr., Granite City, Ill., assignors to Micro Controls, Inc., St. Louis, Mo., a corporation of Ohio
Filed Feb. 29, 1960, Ser. No. 11,907
9 Claims. (Cl. 236—68)

This invention relates to gas regulator apparatus, and with regard to certain more specific features, to such apparatus for oven cooking ranges and the like, the invention being an improvement upon the structure shown in our copending United States patent application Serial No. 830,810, filed July 31, 1959, for Gas Safety Regulator Apparatus, now abandoned.

Among the several objects of the invention may be noted the provision of a regulator which will safely thermostatically regulate within a temperature range having a substantially lower limit than heretofore; the provision of a regulator of the class described which will accurately regulate throughout both comparatively high- and low-temperature ranges; the provision of a regulator of the class described which accomplishes regulation over an increased temperature range by means of a comparatively low-cost and simple arrangement of parts; and the provision of a regulator of this class which may safely and conveniently employ a 110 v. electrical current supply. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIG. 1 is an axial section of a regulator made according to the invention, showing a low-voltage form of safety valve, the section being taken on line 1—1 of FIG. 2, certain parts in FIG. 1 being shown in elevation;

FIG. 4 is a cross section taken on line 4—4 of FIG. 1;

FIG. 5 is an electric and fluid circuit diagram illustrating a low-voltage form of the invention;

FIG. 6 is a cross section taken on line 6—6 of FIG. 1;

FIG. 7 is a cross section similar to the lower right-hand portion of FIG. 1 but showing an alternative 110 v. form of safety valve controls.

Corresponding reference characters indicate corresponding parts throughout the several views of the drawings.

Figure 1:
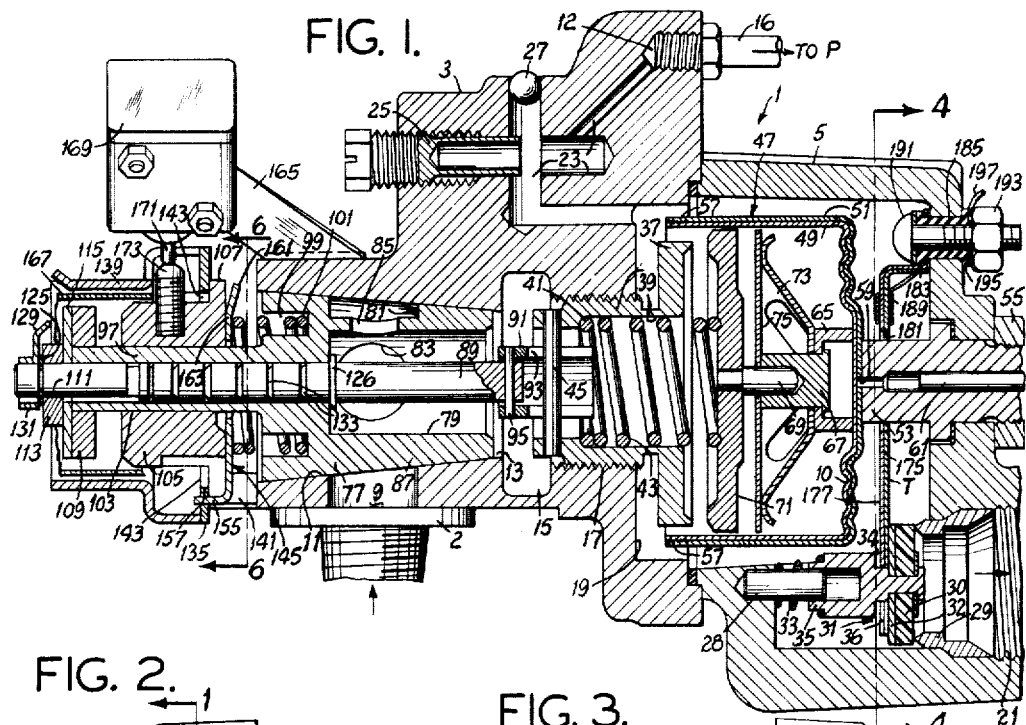

While the invention has particular use for regulating oven temperatures of cooking ranges and will be described in connection therewith, it will be understood it has other space heating uses. Formerly, regulators of the general type herein considered controlled oven temperatures only in a comparatively high-temperature range (from about 200° F. to 550° F.), because below such a range, the burner could not be reliably kept ignited, or be cyclically extinguished and reignited for control purposes. By means of the present invention, extinguishment and reignition are made reliably cyclic in the low-temperature range, thus extending the range of controlled temperatures. For example, by means of the present invention, the lower limit of the temperature range may be 140° F. or less.

Referring now more particularly to the drawings, there is shown at numeral 1 a hollow casing formed of parts 3 and 5, held together by screws 7. At numeral 9 is shown a gas inlet which communicates with a conical valve seat 11 in part 3. A threaded inlet fitting 2 is connected to inlet 9. Inlet 2 is connected with a gas main M, the latter having a connection 6 with an auxiliary pilot burner A located in igniting relationship to a main pilot burner P, the latter in turn being located in igniting relationship to a main heating burner B for the oven space to be heated. The small end 13 of the seat 11 communicates with a passage 15. Opening 17 having threads therein extends from passage 15 to a compartment 19, the latter having a gas outlet 21. This outlet 21, by means of suitable pipe 4, is connected with the main heating burner B in the oven heating space (FIG. 5).

The compartment 19 is connected to a port 12 (FIG. 1) through cross-drilled passages 23 which are under control of an adjustable threaded sleeve valve 25. The passages 23 are composed of various cross drillings, one of which is plugged after drilling by a driven-in ball 27. Port 12 is connected to the main pilot burner P over a pilot gas pipe 16.

In the outlet 21 is a valve seat 29 for a safety cut-off valve 31, biased toward the seat by means of a spring 33. The valve consists of a bushing 35, slidable on a guide 28 and carrying a resilient facing material 30 backed by a washer 32. The bushing 35 is provided with a peripheral groove 34 behind the washer 32, for the reception of the forked end 36 of thermostatic plate T, the function of which will be described below.

At 37 is shown an adjustable outlet valve seat having a tubular member 39 threaded in the opening 17. This tubular member 39 has a shoulder 41 for seating a spring 43. The shoulder at the left carries a crosspin 45. A bimetallic cup-shaped diaphragm 47 is located in the compartment 19. It has an inside wall 49 and an outside wall 51, the latter being soldered or otherwise attached to the end of a nipple and post 53 held by means of a nut 55 in an opening in member 5. The marginal portions 57 of the members 49 and 51 are sealed together as by welding or soldering, the remaining portions of the members 49 and 51 being unjoined. They are corrugated in their portions forming the inside bottom 10 of cup 47. The outside member 51 is provided with an opening 59, communicating through the hollow nipple 53 with a capillary tube 61 sealed thereto and extending to a bulb 63, also located in the oven. The bulb 63, tube 61 and available space between the bimetallic members 49 and 51 are filled with a thermally responsive liquid which is adapted upon thermal expansion in response to heating to enter in between the members 49 and 51, so as to force them apart. This drives the bottom of the member 49 to the left. The inner member 49 includes a support 65 which has a sliding engagement with a cup member 67 in which is a stem 69 of a regulator valve 71. A fingered spring rosette 73 slides on 67 and abuts support 65, pressing marginally against a plate 75 riveted to the end of the member 67. The support 65 and inner portions of the rosette 73 are limitedly slidable to the left on member 67. Thus, in response to increased oven temperatures, the fluid in the system 63, 61, 49, 51 expands and presses to the left the following parts: inside bottom of 49, 65, 73, 69 and valve 71, tending to close off the passage between this valve 71 and its seat 37. The spring 43 provides reaction between the collar 41 and the valve 71 for valve reopening purposes when the fluid cools. In response to very high temperatures, the valve may close upon its seat 37, in which event further expansion of the fluid, pressing upon the bottom of member 49, will overrun parts 65 and 73 on member 67, thus compressing rosette 73 without damage to any parts. Upon cooling, the reverse action occurs and valve 71 moves away from the seat 37 to allow flow of more gas therebetween. The cup shape of the bimetallic parts 49, 51 is for ambient temperature-compensating purposes in a manner known in the art and requiring no elabroation herein.

At numeral 77 is shown a cup-shaped conical plug valve in the conical seat 11. This valve has a hollow center 79 communicating with passage 15. The hollow center 79 is surrounded by a groove 81 which communicates with the center 79 through opposite passages 83 and also through an intermediate passage 85. Only one of the two passages 83 appears in FIG. 1. This leaves a solid portion 87 of the valve 77 for cutting off flow from the inlet 9. The valve may be turned from its initial open position throughout an angular range in which one or both of a passage 83 and 85 are in communication with the inlet 9.

Extending through the conical plug valve 77 is a control stem 89, to the right-hand end of which is attached a sleeve 91, slotted as shown at 93 for the reception of the pin 45. The sleeve 91 is held to the stem 89 by means of a pin 95. Thus if the stem 89 is turned with respect to the valve 77, the tubular member 39 may be threadably turned in the threaded opening 17, thus adjusting the axial position of the valve seat 37 relative to the thermostatically controlled range of movement of the valve 71.

The left-hand end of the valve 77 is provided with a hollow stem 97. A counterbored seat 99 is arranged in valve 77 for the reception of the end of a spring 101. The control stem 89 extends through the hollow valve stem 97 and out beyond its left-hand end. The hollow valve stem 97 and an arbor 105 are splined by means of conjugate flats 103. The arbor 105 is flanged as shown at 107. Thus the hollow valve stem 97 and the arbor 105 are adapted to rotate together but to have relative sliding movements. Splined on the hollow valve stem 97 by means of an extension of the conjugate flat 103 is a washer 109. Thus the washer 109 and the stem 97 are adapted to rotate together.

The left end of the control stem 89 also has a flat, as shown at 111, where it extends from the hollow valve stem 97. This is for the splined reception of a washer 113 having a cooperating conjugate flat. Thus the washer 113 and the control stem 89 are adapted to rotate together.

Figure 2:
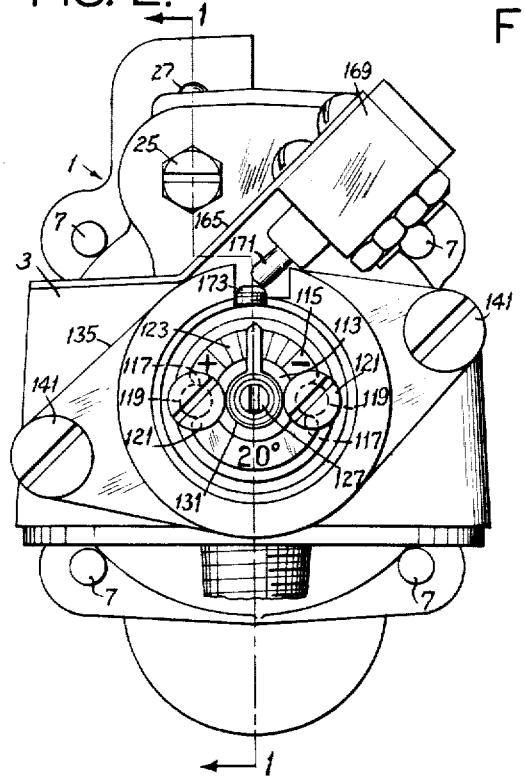
FIG. 2 is a left-end view of FIG. 1.
Figure 3:
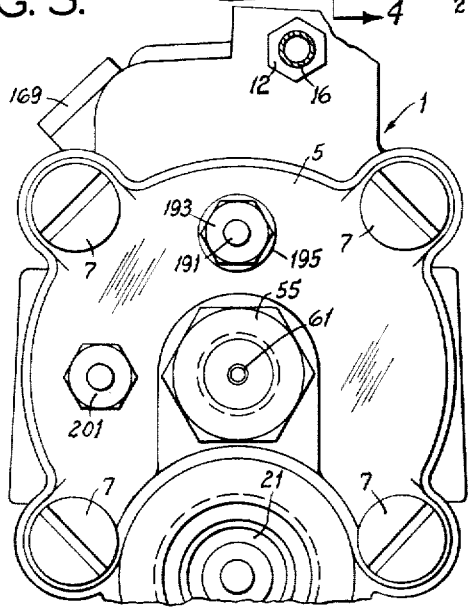
FIG. 3 is a right-end view of FIG. 1, parts being broken away.

At numeral 115 is shown a sheet-metal dial, located at the end of the hollow valve stem 97 and having a central hole interiorly clearing the control stem 89 without any splined relation therewith. The dial 115 is provided with opposite notches 117, accommodating the shanks of screws 119 threaded into the washer 109 (FIG. 2). The heads 121 of the screws overhang the washer 113 and are adapted to clamp it when the screws are tightened in washer 109. Thus by loosening the screws 119, relative rotation may be effected between the control stem 89 and the hollow valve stem 97. This is accomplished by applying a screwdriver to the slot 127 of the stem 89. During relative rotation, the washer 113 rotates with stem 89 while the washer 109 rotates with the valve stem 97, holding with it the dial 115. The dial is indexed, as shown at 123, to show angles of adjustment between stems 89 and 91 which accord to 20° steps in controlled temperature (see designation 20° carried on dial 115). The control stem 89 is prevented from moving axially by collar-forming horseshoe spring washers 125 and 126, clipped into grooves in the stem 89. The right-hand one of these (126) becomes located adjacent the bottom of the hollow center 79 in the plug valve 77. The left-hand one of these (125) is located adjacent washers 113. The sum of the thicknesses of the washer 113 and dial 115 snugly infills the space between washer 125 and the end of the stem 97. The stem 89, with some clearance, freely floats with respect to the valve 77, both when the screws 119 are loose for adjustment and when they are tightened after an adjustment. A small pointer 129, having a central collar 131, is press-fitted onto the end of the stem 89 to indicate in connection with the indexing 123 the angular adjustment between stem 89 and the valve 77. Numerals 133 indicate lubricant-retention grooves in the stem 89.

At numeral 135 is shown a sheet-metal platform member, having struck-out supports 137 engaging the end of the member 3. Overlying this platform member 135 is a sheet-metal jacket 139. Parts 135 and 137 are held to member 3 on the supports 137 by means of screws 141. Members 135 and 139 forms a cage for the arbor 105 and the extensions of stems 89 and 97. When assembled, the flange 107 of the arbor 105 lies between the platform member 135 and body 3. The body portion of the arbor extends through an opening 143 in platform 135, which opening is somewhat larger than the diameter of the arbor. This admits an extension sleeve 167 of a control knob K which is calibrated for reading degrees of temperature attained in the heated space (oven). It may be referred to as a setting dial. Its calibration range extends much lower than heretofore, for example, from about 140° F. to 550° F., instead of, say, 200° F. to 550° F., or 225° F. to 550° F., as heretofore was the practice. Adjacent the right-hand end of the arbor 105 is a latch plate 145. This plate has ears 147, loosely interfitting with opposite notches 149 of the flange 107. It also has radially extending ears 151 and 153, flanking a tongue 155 which is struck out toward a notch 157 cut into the bottom of the opening 143. Tongue 155 is normally located as shown in FIG. 1. Ears 151 and 153 are adapted when plate 145 is rotated alternately to engage a lug 159, struck out to the right of the platform member 135.

The plate 145 has a bent-out ear 161 which, with the remainder of the plate, forms a rocking edge 163. This edge 163 is adapted for rocking of the plate on the flanged end of the arbor 105. The spring 101, reacting from valve 77, presses on the latch plate 145, normally forcing it flat against the flange 107, as shown in FIGS. 1 and 6. Thus upon moving the arbor 105 to the right, the spring is compressed until the ear 161 engages member 3. This rocks the plate 145 anticlockwise to withdraw the tongue 155 from the notch 157. This frees the arbor for rotation. Upon rotation of about 276° (angular measure) from the FIG. 6 position (wherein ear 153 engages stop 159), ear 151 will engage the other side of the stop 159. Such rotary action first opens the gas inlet 9 and maintains it open, the flow of gas being thereafter controlled by the thermostatic action of the valve 71 in connection with the valve seat 37.

Mounted on the member 3 is a bracket 165 which carries a current supply switch in the form of an electric microswitch 169. This has an operating plunger 171 normally biased by spring means within the switch in an outward direction, so as to close the switch. Details of the interior of the switch will not be necessary, since it is of conventional variety. It suffices to say that when the plunger 171 is pressed inward, as shown in FIG. 2, the switch is open. The plunger 171 is pressed inward to open the switch by a lug in the form of a set screw 173, threaded into the arbor 105. This occurs in the closed position of the valve 77. When the valve is opened by pushing in and turning the member 167 anticlockwise, the lug 173 moves from under the plunger 171, thus allowing the switch 169 to close. Thus it will be seen that the switch 169 is open when the valve 77 is in its initial closed position. The switch is closed throughout all positions of the valve 77 when it is turned open anticlockwise from the position shown in FIGS. 1 and 2.

Returning to the thermostat T, it consists of a cantilever form of a bimetallic plate having a sheet of metal 175 of relatively high coefficient of expansion, and a sheet of metal 177 of relatively low coefficient of expansion. This sheet contains the extension 36 and also wide portion 179, having an opening 181 surrounding the nipple post 53. At its upper end, the plate T is offset, as shown at 183, where it is anchored by means of a shouldered insulating sleeve 185, located in an opening in the body 5. At the end of the sleeve 185 is a wire terminal 187 of an insulated heater coil 189, which is wrapped around the enlarged portion 179 of the thermostat T. A bolt 191 clamps in position the parts 185, 187 and 183. The bolt 191 is held by a nut 193, the latter being insulated by means of a washer 195. The nut 193 also holds in position a lead wire 197. The other end of the insulated heating wire 189 extends to another terminal 199 and is grounded upon the member 5 by means of a bolt and nut connection 201. When heated by excitation of coil 189, the plate 177 rapidly opens the safety valve 31. When cooled by deexcitation of coil 189, it rapidly closes this valve 31.

Referring to FIG. 5, L1 and L2 indicate a supply circuit to the primary of a transformer R. The secondary of the transformer is grounded and wired through a timer C by means of a line 203 which extends to the switch 169. The timer C includes a switch 170 in line 203 automatically operable by the timer. The switch 170 is of the type that its automatic operation by timer C may be overridden by manual closing operation from a manual control element 172. Further details in this regard are unnecessary, this type of manual override timing switch means being known. Switch 169 is connected through a lead 205 with a flame switch F, the latter being in heat-exchange relationship with the flame of pilot P. The line 205, through switch F, is connected to the heater 189 over the line 197, the heater being grounded through the connection 201. The flame switch F when closed also feeds a line 207, extending to a pilot lamp 209, which is also grounded. Closing of the flame switch is effected by heating it from the flame of main pilot burner P.

Operation is as follows, assuming that at the start the space (oven) to be heated is cold and that the plug valve 77 is closed:

Assuming the presence of gas in the main M, some will find its way over line 6 to the auxiliary pilot A, which is ignited. This prepares the apparatus (stove) for use. It will be understood that the flame from auxiliary pilot A is small and burns constantly.

When the oven is cold the regulator valve 71 will be open and the safety valve 31 closed. To light the oven, setting dial K is pushed in and turned anticlockwise to a desired position, for example, in the high-temperaure range (200° F. and up). This opens the conical gas supply valve 77 and backs off seat 37 to a point at which valve 71 will regulate to the desired temperature as indicated on dial K. Provided the timer switch C or its equivalent is closed, this also closes switch 169 and completes the electric circuit through 203, 205, flame switch F (if closed), 207 and lamp 209 to ground return; also 197, heater 189 and 201 to ground return. Gas then flows from the open gas supply valve 77 through space 15, 19, past open regulator valve 71, ports 23, line 16 to the main pilot P, which lights from the constantly burning auxiliary pilot A. Heat from pilot P closes the flame switch F, which causes the lamp 209 to glow, showing that the range is operative. The closed flame switch F delivers current over line 197 to the heater 189 of the thermostat T, thus promptly opening the safety valve 31 so that a substantial amount of gas can flow through line 4 to the burner B, which then becomes ignited from the main pilot P.

Modulated high-range temperature regulation is obtained from valve 71 during such time as the user has the setting dial K set in the high-temperature range (within 200° F. to 550° F., for example). By modulated regulation is meant that during which valve 71 in regulating moves back and forth without closing, whereby the burner flame varies gradually without danger of extinguishment.

It will be understood that if the setting dial is set to a calibrating point in the low range (140° F. to 200° F., for example), then the seat 37 will be screwed so far to the right that a critical condition is reached wherein the valve 71 tends to close completely during a cooling part of the regulating cycle, thus extinguishing the burner B. This condition limited the low safe point of the regulating range of former systems, because below such safe point, around 200° F. or so, a next call for heat might cause the burner to emit a surge of unburned gas before its reignition, with resulting danger of explosion upon burner ignition, as called for by the next heating cycle. By means of the present invention, advantage is taken of the tendency for the valve 71 to close in the addtional low-temperature range by incorporating a safe reignition means and by employing an on-off gas control cycle in the low-temperature range, instead of the gradual modulation employed in the high-temperature range. Thus if the user by clockwise movement from the high range sets the dial K in the low-temperature range, and the valve seat 37 becomes positioned more to the right, this accelerates complete closure of valve 71 which cuts off gas to pilot P. Then when pilot P is out, the flame switch F cools, turning off lamp 209 and depriving heater 189 of current. The thermostat T then rapidly cools and promptly shuts off the safety valve 31. This excludes gas from burner B until the safety valve 31 is reopened by reigniting pilot P to reclose flame switch F. The auxiliary pilot A does not go out. Then, as the oven cools (to the set temperature within the lower range) the regulator valve 71 reopens. The reignition cycle then starts over in the low-temperature range, with pilot P first receiving gas through the reopened regulator valve 71, its reignition occurring from the auxiliary pilot A. This closes the flame switch F, reopening the safety valve 31, to supply the burner B for reignition from the reignited pilot P.

In view of the above, it will be seen that in the high-temperature regulating range the regulation is by modulation of the flame from burner B without the flame going out. In the low-temperature range, regulation occurs by complete cycles of extinction and reignition of burner B.

To turn off the burner B during operation either in the high-temperature or the low-temperature range, the dial K is returned to the off position, which closes plug valve 77, thus depriving the entire system of gas, with the exception of the amount flowing through line 6 to the auxiliary pilot A. At the same time, the switch 169 is reopened, thus depriving the system of all current. It may be remarked that the auxiliary pilot A is safe, for even if blown out, such a minute amount of gas escapes as to be harmless.

Figure 8:
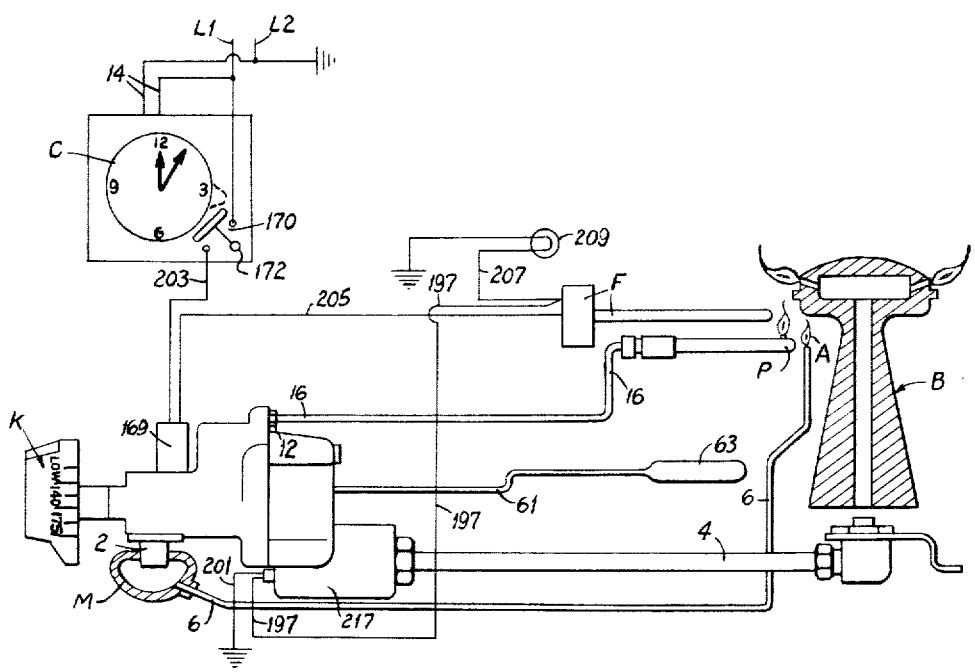
FIG. 8 is a view like FIG. 5 but showing the 110 v. form of the invention.

In FIGS. 7 and 8 is shown a modification of the invention adapting it to use with 110 v. current direct from the lines L1 and L2 without the use of a transformer such as shown at R in FIG. 5. In this case (FIG. 8), lines L1 and L2 feed 110 v. current directly to the timer C over wires 14. Line L2 is grounded and line L1 is connected directly to a contact of the switch 170. This supplies 110 v. to the system instead of the lower voltage such as 12 v. employed in the FIG. 5 construction. The construction of FIG. 7 is then employed for operating the safety valve 31. In this case the valve 31 carries an armature 211 forming the core of a solenoid 213, the base 215 of which is threaded into a modified portion 217 of the body 5. A spring 219 reacts from a face of the solenoid 213 to bias the valve 31 toward closed position. Solenoid 213 is supplied with current over line 197 and ground connection 201 when the flame switch F closes for the purpose of exciting the solenoid and opening the valve 31. The operation of this form of the invention is the same as that already described in connection with FIGS. 1–7. However, it has the advantage over the form of safety valve shown in FIG. 1 in that the solenoid 213 operates the safety control valve 31 more rapidly, thus earlier depriving the burner B of gas. Therefore, regulation becomes more sensitive. To this end a fast-acting form of flame switch F is also desirable. Various forms of these are available, such as the bimetal, mercury and hydraulic types, the mercury type being the fastest. Further description of such flame switches will be unnecessary, inasmuch as they are known in the art.

The lamp 209 gives an indication of whether or not the main burner B is ignited when the apparatus is set for modulating high-temperature regulation, and whether or not it is cycling under on-off control prevailing under low-temperature regulation.

While the valve 31 has safety functions, insofar as it prevents flow of gas to the main burner when both pilot lights are out, it also has the important low-temperature range regulating functions as above described.

It will be seen that the invention provides a convenient, accurate and safe temperature-control system for oven or like space heat regulation throughout both high- and low-temperature ranges, and that it is useful with both comparatively low- and high-voltage electrical circuits.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Regulated gas heating apparatus, comprising a space heating burner, a main pilot burner adjacent thereto, a gas supply means, a constantly burning auxiliary pilot burner connected to said gas supply means adapted to light said main pilot burner adjacent said heating burner, a flame switch adapted to be closed upon heating and which is in heat-exchange relation with said main pilot burner, a body forming a gas chamber having a gas inlet adapted for connection with said gas supply means, first gas outlet means in the body adapted for connection with said heating burner, a second gas outlet means in the body adapted for connection with said main pilot burner, a first valve controlling gas flow through said first gas outlet means, electrical control means for said first valve forming a series circuit connection with said flame switch and adapted when energized to open said first valve from a closed position, a thermostatic control valve in said chamber adapted for opening action in response to fall in space temperature engendered by the heating burner and adapted for closing action upon increase of said temperature, said thermostatic valve being adapted to receive gas from said inlet and to control flow to both outlet means, a supply controlling flow through said inlet, and a current supply switch connected in series circuit with said flame switch and said electrical control means of the first valve, said supply switch being adapted to close when said supply valve is turned on.

2. Regulated gas heating apparatus according to claim 1, including means adapted to adjust said thermostatic control valve throughout a range wherein at comparatively high temperatures its regulating opening and closing movements occur without intervening periods of closure sufficient to extinguish the heating burner and the main pilot burner, and at comparatively low temperatures its opening and closing movements occur with intervening periods of closure sufficient to extinguish the heating burner and the main pilot burner.

3. Regulated gas heating apparatus according to claim 1, wherein said first valve is of the type adapted for substantially rapid on-off action in response to actuation by said electrical means.

4. Regulated gas heating apparatus according to claim 3, wherein said electrical means is a solenoid.

5. Regulated gas heating apparatus according to claim 4, wherein said current supply switch, said flame switch and said solenoid are adapted for operation in a supply circuit operating at line voltage.

6. A heat regulator system comprising a space heating burner, a gas supply means, a main pilot burner adjacent thereto, a constantly burning auxiliary pilot burner connected to said gas supply means adapted to light said main pilot burner adjacent said heating burner, a flame switch adapted to be closed upon heating which is in heat-exchange relation with said main pilot burner, a body forming a gas chamber having a gas inlet connected with said gas supply means, first gas outlet means in the body connected with said heating burner, a second gas outlet means in the body connected with said main pilot burner, an on-off valve in said chamber controlling gas flow through said first gas outlet means, electrical means in series circuit connection with said flame switch adapted when energized to open said on-off valve, a thermostatic control valve in said chamber adapted for opening in response to fall in space temperature engendered by the heating burner and adapted for closing upon increase of said temperature, said thermostatic valve being connected to receive gas from said inlet and to control flow to both outlet means, a supply valve adapted to start and stop flow through the inlet, and a current supply switch connected in series circuit with said flame switch and said electrical means of the on-off valve, said supply switch being adapted to close when said supply valve is turned on.

7. A heat-regulator system according to claim 6, including means for adjusting said thermostatic control valve throughout a range wherein at comparatively high temperatures its regulating opening and closing movements occur without intervening periods of closure sufficient to extinguish the heating burner and the main pilot burner, and at comparatively low temperatures its opening and closing movements occur with intervening periods of closure sufficient to extinguish the heating burner and the main pilot burner.

8. Regulated gas heating apparatus, comprising a space heating burner, a main pilot burner adjacent thereto, gas supply means, a constantly burning auxiliary pilot burner connected to said gas supply means adapted to light said main pilot burner which is adjacent to said heating burner, a circuit, a flame switch in said circuit adapted to close the circuit upon heating and located in heat-exchange relation with said main pilot burner, a body forming a gas chamber having a gas inlet adapted for connection with said gas supply means, first gas outlet means in the body adapted for connection with said heating burner, a second gas outlet means in the body adapted for connection with said main pilot burner, an electrically operative valve having an electrical control element in said circuit and controlling gas flow through said first gas outlet means, said valve adapted to be opened from a closed position by excitation of its control element from said circuit when the flame switch is hot and closed, a thermostatic control valve in said chamber controlling flow of gas to both of said outlet means adapted for opening action in response to fall in space temperature engendered by the space heating burner and adapted for closing action upon increase of said temperature, said thermostatic valve being adapted to receive gas from said inlet, and means for adjusting said thermostatic control valve for action throughout a range wherein at comparatively high temperatures its regulating opening and closing movements occur without intervening periods of complete closure sufficient to extinguish the heating burner and main pilot burner, and at comparatively low temperatures its opening and closing movements occur with intervening periods of closure sufficient to extinguish the heating burner and the main pilot burner.

9. Regulated gas heating apparatus comprising a space heating burner, pilot burner means adjacent thereto, gas supply means, a body forming a gas chamber having a gas inlet adapted for connection with said gas supply means, first gas outlet means in the body adapted for connection with said heating burner, a second gas outlet means in the body adapted for connection with said pilot burner means for supplying gas thereto, means connected to said gas supply means adapted to supply sufficient gas to maintain ignition of any gas passing to said pilot burner means, a circuit, a flame switch in said circuit located in heat-exchange relation with said pilot burner means and adapted to close the circuit upon being heated by the ignited gas passing from said second outlet means to said pilot burner means, an electrically operative valve having an electrical control element in said circuit and controlling gas flow through said first outlet means, said valve adapted to be opened from a closed position by excitation of its control element from said circuit when said flame switch is hot and closed, a thermostatic control valve in said chamber controlling flow of gas to both of said outlet means adapted for opening action in response to fall in space temperature engendered by the space heating burner and adapted for closing action upon increase of said temperature, said thermostatic valve being adapted to receive gas from said inlet, and means for adjusting said thermostatic control valve for action throughout a range wherein at comparatively high temperatures its regulating opening and closing movements occur without intervening periods of complete closure sufficient to extinguish the heating burner or stop the flow of gas through said second outlet means, and at comparatively low temperatures its opening and closing movements occur with intervening periods of closure sufficient to extinguish the heating burner and stop the flow of gas through said second outlet means.

References Cited in the file of this patent
UNITED STATES PATENTS

| | | |
|---|---|---|
| 455,382 | Bell et al. | July 7, 1891 |
| 1,704,807 | O'Neal | Mar. 12, 1929 |
| 1,842,335 | Te Pas | Jan. 19, 1932 |
| 2,372,307 | Alexander | Mar. 27, 1945 |
| 2,483,191 | Gauger | Sept. 27, 1949 |
| 2,557,927 | Abrams et al. | June 26, 1951 |
| 2,628,677 | Strobel | Feb. 17, 1953 |
| 2,885,150 | Douglas | May 5, 1959 |
| 2,967,021 | Swenson et al. | Jan. 3, 1961 |

FOREIGN PATENTS

| | | |
|---|---|---|
| 803,132 | France | June 29, 1936 |

UNITED STATES PATENT OFFICE
CERTIFICATE OF CORRECTION

Patent No. 3,090,560 May 21, 1963

Walter H. Holzboog et al.

It is hereby certified that error appears in the above numbered patent requiring correction and that the said Letters Patent should read as corrected below.

Column 7, line 56, after "supply" insert -- valve --.

Signed and sealed this 3rd day of December 1963.

(SEAL)
Attest:

ERNEST W. SWIDER

Attesting Officer

EDWIN L. REYNOLDS

Acting Commissioner of Patents